(12) United States Patent
Probst et al.

(10) Patent No.: US 8,027,941 B2
(45) Date of Patent: Sep. 27, 2011

(54) AUTOMATED CLASSIFICATION ALGORITHM COMPRISING AT LEAST ONE INPUT-INVARIANT PART

(75) Inventors: Katharina Probst, Dyer, IN (US); Rayid Ghani, Chicago, IL (US)

(73) Assignee: Accenture Global Services Limited, Dublin (IE)

(*) Notice: Subject to any disclaimer, the term of this patent is extended or adjusted under 35 U.S.C. 154(b) by 987 days.

(21) Appl. No.: 11/855,493

(22) Filed: Sep. 14, 2007

(65) Prior Publication Data

US 2009/0076989 A1    Mar. 19, 2009

(51) Int. Cl.
*G06F 15/18* (2006.01)
*G06E 1/00* (2006.01)

(52) U.S. Cl. .................... 706/14; 706/15; 706/20

(58) Field of Classification Search .................... None
See application file for complete search history.

(56) References Cited

U.S. PATENT DOCUMENTS

| | | |
|---|---|---|
| 5,146,406 A | 9/1992 | Jensen |
| 5,943,670 A | 8/1999 | Prager |
| 6,405,175 B1 | 6/2002 | Ng |
| 6,668,254 B2 | 12/2003 | Matson |
| 6,714,939 B2 | 3/2004 | Saldana |
| 6,785,671 B1 | 8/2004 | Baley et al. |
| 6,936,104 B2 | 8/2005 | Gorra |
| 7,020,662 B2 | 3/2006 | Boreham et al. |
| 7,043,420 B2 | 5/2006 | Ratnaparkhi |
| 7,043,492 B1 | 5/2006 | Neal et al. |
| 7,567,976 B1 | 7/2009 | Betz et al. |
| 2002/0111863 A1 | 8/2002 | Landesman |
| 2002/0133479 A1 | 9/2002 | Dippold |
| 2002/0142277 A1 | 10/2002 | Burstein et al. |

OTHER PUBLICATIONS

Hoiem et al., D., "Object-Based Image Retrieval Using the Statistical Structure of Images", IEEE Conference on Computer Vision and Pattern Recognition, pp. 1-8, 2004.*
DeCoste et al., D., "Distortion-Invariant Recognition via Jittered Queries", IEEE, pp. 1-6, 2000.*
Zhou, Y.,"Democratic Co-Learning", 16th IEEE Conference on Tools with Artificial Intelligence, pp. 1-9, 2004.*
Zufiria et al., P., "Extended Backpropagation for Invariant Pattern Recognition Neural Networks", International Joint Conference on Neural Networks, pp. 2097-2100, 1993.*
Licsar et al., A., "User-Adaptive Hand Gesture Recognition System with Interactive Training", Image and Vision Computing 23m pp. 1102-1114, 2005.*

(Continued)

*Primary Examiner* — Jeffrey A Gaffin
*Assistant Examiner* — Adrian Kennedy
(74) *Attorney, Agent, or Firm* — Vedder Price PC

(57) ABSTRACT

A classification algorithm is separated into one or more input-invariant parts and one or more input-dependent classification parts. The input-invariant parts of the classification algorithm capture the underlying and unchanging relationships between the plurality of data elements being operated upon by the classification algorithm, whereas the one or more classification parts embody the probabilistic labeling of the data elements according to the various classifications. For any given iteration, a user's input is used to modify at least one classification part of the algorithm. Recalculated classification parts (i.e., updated classification results) are determined based on computationally simple combinations of the one or more modified classification parts and the one or more input-invariant parts. Preferably, a graphical user interface is used to solicit user input. In this manner, wait times between user feedback iterations can be dramatically reduced, thereby making application of active learning to classification tasks a practical reality.

16 Claims, 4 Drawing Sheets

OTHER PUBLICATIONS

Becker, D., "Sensei: A Real-Time Recognition, Feedback and Training System for T'ai Chi Gestures", MIT Media Lab Perceptual Computing GRoup Technical Report No. 426, pp. 1-50, 1997.*

K. Probst, R. Ghani: "Towards 'Interactive' Active Learning in Multiview Feature Sets for Information Extraction", Lecture Notes in Computer Science, vol. 4701, Sep. 8, 2007, pp. 683-690, XP019071429.

K. Probst, R. Ghani, M. Krema, A. Fano, Y. Liu: "Semi-Supervised Learning of Attribute-Value Pairs from Product Descriptions" Proceedings of the 20th International Joint Conferences on Artificial Intelligence (IJCAI '07), Jan. 6-12, 2007, pp. 2838-2843, XP007906331.

K. Probst, R. Ghani, M. Krema, A. Fano, Y. Liu: "Semi=Supervised Learning to Extract Attribute-Value Pairs from Product Descriptions on the Web", Proceedings of the 2006 Workshop on Web Mining (Webmine '06); 17th European Conference on Machine Learning (ECML '06) & 10th European Conference on Principles and Practice of Knowledge Discovery in Databases (PKDD '06) Sep. 18, 2006, pp. 38-49, XP002504179.

K. Nigam, R. Ghani: "Analyzing the effectiveness and appilcability of co-training", Proceedings of the 9th International Conference on Information Knowledge Management (CIKM '00), Nov. 6-11, 2000, pp. 86-93, XP00790319.

International Search Report and Written Opinion for PCT/GB2008/003118 dated Sep. 12, 2008, Form PCT/ ISA/210.

International Preliminary Report on Patentability under Chapter I for PCT/GB2008/003118 dated Mar. 25, 2010.

"Combining Labeled and Unlabeled Data with Co-Training", Avrim Blum & Tom Mitchell, Proceedings of the 1998 Conference on Computational Learning Theory, 1998.

"Transformation-Based Error-Driven Learning and Natural Language Processing: A Case Study in Part of Speak Tagging", Eric Brill, Computational Linguistics, 1995.

" Unsupervised Models for Named Entity Classification", Michael Collins & Yoram Singer, EMNLP/VLC, 1999. AT&T Labs—Research.

"Active Learning Selection Strategies for Information Extraction", Aidan Finn and Micholas Kushmerick, ECML-03 Workshop on Adaptive Text Extraction and Mining 2003.

"A Comparison of Efficacy and Assumptions of Bootstrapping Algorithms for Training Information Extraction Systems", Rayid Ghani and Rosie Jones, LREC 2002 Workshop on Linguistic Knowledge Acquisition, 2002.

"Learning to Extract Entities from Labeled and Unlabeled Text", Rosie Jones, Ph.D. Dissertation, School of Computer Science, Carnegie Mellon University, Pittsburg PA 15213, May 2005.

"Active Learning for Information Extraction with Multiple View Feature Sets", Rosie Jones, Rayid Ghani, Tom Mitchell, & Ellen Riloff, ECML 2003 Workshop on Adaptive Text Extraction and Mining, 2003.

"A Sequential Algorithm for Training Text Classifiers", David Lewis and William Gale, ICML, 1994, Proceedings of Seventeenth Annual International ACM-SIGIR Conference on Research and Development in Information Retrieval, Springer-Verlag, London, pp. 3-12.

"Dependency-Based Evaluation of Minipar", Dekang Lin, Workshop on the Evaluation of Parsing Systems, 1998.

"Employing EM and Pool-Based Active Learning for Text Classification", Andrew McCallum and Kamal Nigam, Proceedings of ICML, 1998.

"Active+ Semi-Supervised Learning=Robust Multi-View Learning", Ion Muslean, Steven Minton and Craig Knoblock, Proceedings of the ICML, 2002.

"Analyzing the Effectiveness and Applicability of Co-Training", Kamal Nigam & Rayid Ghani, CIKM, 2000.

"Accurate Information Extraction from Research Papers using Conditional Random Fields", Fuchun Peng & Andrew McCallum, HLT, 2004.

"Extracting Product Features and Opinions from Reviews", Ana-Maria Popesscu and Oren Etzioni, EMNLP, 2005.

"Active Learning for Natural Language Parsing and Information Extraction", Cynthia Thompson, Mary Califf, and Raymond Mooney; ICML, 1999.

"Support Vector Machine Active Learning with Applications to Text Classification", Simon Tong, Daphne Koller, Journal of Machine Learning Research, 2001.

"Opinion Observer: Analyzing and Comparing Opinions on the Web", Bing Liu, Minqing Hu, and Junshengn Cheng, WWW 2005.

"Learning Hidden Markov Model Structure for Information Extraction", Kristie Seymore, Andrew McCallum, and Ronald Rosenfeld, AAAI 99 Workshop on Machine Learning for Information Extraction, 1999.

Songfeng, "Unsupervised Clustering Based Reduced Support Vector Machines" IEEE 2003, pp. 821-824.

Guha, "A Clustering Algorithm for Categorical Attributes", Elsevier, 2000, pp. 1-24.

Nauman, "Declarative Data Mining with Conflict Resolution", IBM, 2002, pp. 1-13.

Ghani, "Mining the Web to Add Semantics to Retail Data Mining", Springer, 2004, pp. 43-56.

Ester, "A Density-Based Algorithm for Discovering Clusters in Large Spatial Databases with Noise", AAI, 1996, pp. 226-231.

Dempster, A.P., et al., "Maximum Likelihood from Incomplete Data via the EM Algorithm", Journal of Royal Statistical Society, Series B, 39 (1):1-38, 1977.

Agrawal, R., et al., "Fast Discovery of Association Rules", in U. Fayyad et al., editors, Advances in Knowledge Discovery and Data Mining, AAAI Press/ The MIT Press, pp. 307-328, 1996.

Jaakkolda, T., et al., "Exploiting Generative Models in Discriminative Classifiers", In Advances in NIPS, 1999.

Lewis, D.D., "Naive (Bayes) at Forty: The Independence Assumption in Information Retrieval", in Machine Learning ECML-98, Tenth European Conference on Machine Learning, pp. 4-15, 1998.

Nahm, U.Y., et al., "Text Mining with Information Extraction", in AAAI 2002 Spring Symposium on Mining Answers from Texts and Knowledge Bases, 2002.

McCallum & K. Nigam, "A Comparison of Event Models for Naive Bayes Text Classification", in Learning for Text Categorization: Papers from the AAAI Workshop, pp. 41-48, 1998. Tech. Rep. WS 98-05, AAAI Press.

Ghani, R., et al., "Data Mining on Symbolic Knowledge Extraction from the Web," in Workshop of Text Mining at the Sixth ACM SIGKDD International Conference on Knowledge Discovery and Data Mining.

Joachim, T., "Transductive Inference for Text Classification Using Support Vector Machines", in Machine Learning: Proceedings of the Sixteenth International Conference, 1999.

Craven, M., et al., "Learning to Construct Knowledge Bases from the World Wide Web", Artificial Intelligence, 118 (1-2): 69-114, 2000.

Schafer, J. Ben, et al., "E-Commerce Recommendation Applications", GroupLens Research Project, Department of Computer Science and Engineering, University of Minnesota, 2001.

Ghani R. and A. Fano, "Building Recommender Systems using a Knowledge base of Product Semantics", Accenture Technology Labs, Chicago, IL, 2002.

Lin, D., "Dependency-Based Evaluation of Minipar", Department of Computer Science, University of Alberta, Edmonton, Alberta, Canada 1998.

Porter, M.F., "An Algorithm for Suffix Stripping", Program, 14 No. 3, pp. 130-137, Jul. 1980.

Nigam, et al., "Text Classification from Labeled and Unlabeled Documents using EM", Machine Learning 1-34, Kluwer Academic Publishers, Boston, Manufactured in the Netherlands, vol. 39 Issue 2-3, May-Jun. 2000.

Agrawal, et al., "On Integrating Catalogs", ACM, May 2001.

Joachims, "A Probabilistic Analysis of the Rocchio Algorithm with TFIDF for Text Categorization", Carnegie Mellon University, Mar. 1998.

* cited by examiner

AUTOMATED CLASSIFICATION ALGORITHM COMPRISING AT LEAST ONE INPUT-INVARIANT PART

CROSS-REFERENCE TO RELATED APPLICATIONS

The instant application is related to co-pending U.S. patent application Ser. Nos. 10/119,665, 11/742,215 and 11/742,244.

FIELD OF THE INVENTION

The instant disclosure relates generally to classification algorithms and, in particular, to the use of a classification algorithm formulated to comprise at least one input-invariant part, thereby fostering incorporation of user input or feedback.

BACKGROUND OF THE INVENTION

Active learning concerns techniques for incorporating user input or feedback to improve the accuracy of models developed by learning-capable algorithms. Most research in active learning has focused on improving techniques for selecting the next example to be used to prompt feedback from a user. That is, most research has been concerned with prompting the user for input that will most improve the accuracy of the model produced by the algorithm. However, this is often provided at the cost of increased time between iterations of active learning feedback, which in practice results in the user spending a prohibitive amount of time waiting for the system between iterations. The long wait times between feedback iterations result because the model (which tends to be highly complex and input-dependent) must be updated each time the user's input is provided. Indeed, the resulting wait times between iterations become so great as to make a practical system very difficult to achieve.

A practical active learning system would be of great benefit to a variety of tasks, including classification tasks. A classification task of particular interest is the extraction of attribute-value pairs from natural language documents that describe various products. Various techniques for performing such attribute-value extraction are described in our prior U.S. patent application Ser. No. 11/742,215 (the "'215 application") and/or U.S. patent application Ser. No. 11/742,244 (the "'244 application"), the teachings of which prior applications are incorporated herein by this reference. As noted therein, retailers have been collecting a growing amount of sales data containing customer information and related transactions. These data warehouses also contain product information that is often very sparse and limited. Treating products as atomic entities hinders the effectiveness of many applications for which businesses currently use transactional data, for such as product recommendation, demand forecasting, assortment optimization, and assortment comparison. While many retailers have recently realized this and are working towards enriching product databases with attribute-value pairs, the work is currently done completely manually, e.g., through inspection of product descriptions that are available in an internal database or through publicly available channels (such as the World Wide Web), or by looking at the actual product packaging in a retail environment. While our prior U.S. patent applications describe techniques that beneficially automate these tasks, the techniques described therein could be further improved through use of active learning, i.e., through the limited use of expert feedback. To this end, it would be particularly advantageous to provide techniques that allow active learning to be incorporated into classification tasks, such as that described above, without the prohibitive lag times between feedback iterations.

SUMMARY OF THE INVENTION

The instant disclosure describes techniques that substantially reduce much of the wait time between feedback iterations in active learning systems. In particular, a classification algorithm may be separated into one or more input-invariant parts and one or more input-dependent classification parts. The input-invariant parts of the classification algorithm capture the underlying and unchanging relationships between the plurality of data elements being operated upon by the classification algorithm. On the other hand, the one or more classification parts embody the probabilistic labeling of the data elements according to the various classifications available in the model. In a presently preferred embodiment, the various labels that may be applied to words or phrases include attribute and value. However, the present invention is not limited in this regard and may be beneficially applied to virtually any classification schema susceptible to implementation using a classification algorithm as described herein.

For any given iteration of user input, the user's input is used to modify at least one classification part of the algorithm. Thereafter, recalculated classification parts (i.e., updated classification results) are determined based on computationally simple combinations of the one or more modified classification parts and the one or more input-invariant parts, as opposed to prior art techniques in which the entire classification model required extensive re-computation. After a desired number of iterations have been performed, or upon attainment of a convergence condition, final classification probabilities may be determined for each data element being analyzed. In a presently preferred embodiment, a graphical user interface (which may be implemented as a web interface, for example) is incorporated to solicit user input. In this manner, wait times between user feedback iterations can be dramatically reduced, thereby making application of active learning to classification tasks a practical reality.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
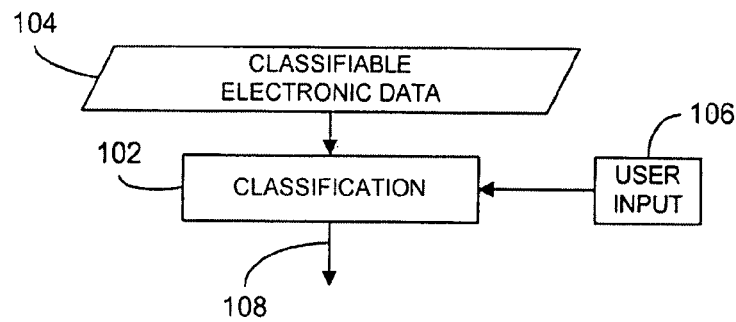
FIG. 1 is a block diagram schematically illustrating high-level processing in accordance with the instant disclosure.

Referring now to FIG. 1, high-level processing in accordance with one embodiment is illustrated in block diagram form. In particular, classifiable electronic data 104 is provided as input to a classification process 102. Using techniques described in further detail below, the classification process 102 provides, in this case, the desired extracted information 108 based in part upon user input or feedback 106. In a presently preferred embodiment, the processing of the various embodiments of the present invention, as exemplified in FIG. 1, is carried out using one or more suitably programmed computers or equivalents thereof.

The classifiable electronic data 104 may comprise any kind of electronically-represented data that may be operated upon by an automated classification algorithm. For example, the data 104 may comprise virtually any digitally represented text, audio, video, still images, etc. possessing attributes that may be identified, thereby allowing them to be operated upon by an automated classification algorithm. In a presently preferred embodiment, the classifiable electronic data 104 comprises at least one natural language document that describes one or more products although, in practice, descriptions of any desired subject matter, topic, theme, etc. may be equally employed. As used herein, a natural language document comprises any document that at least textually describes the desired subject matter using virtually any language syntax normally used by, and intended for consumption by, humans, either orally or in written form, when describing something. As such, a natural language document may be expressed in any language. In a most general sense, a product may comprise anything that may be described using a natural language document and, in a presently preferred embodiment, comprises any object or service that is made available by a supplying entity (e.g., retailers, manufacturers, etc.) for use by interested consumers. For instance, it is anticipated that the present invention may be beneficially applied to retailers or other commercial enterprises that offer an array of merchandise and/or services for sale. However, the present invention need, not be limited to commercial contexts and may be beneficially applied to any domain where it would be beneficial to gain insight into things described in natural language documents or, more generally, things that may be represented as classifiable electronic data.

As an example, products falling within the general category of sporting goods is an interesting and relatively challenging domain because, unlike electronic consumer goods, the attributes are not easy and straightforward to detect. For example, a camera has a relatively well-defined list of attributes (resolution, zoom, memory-type, etc.). In contrast, a baseball bat would have some typical attributes such as brand, length, material as well as others; that might be harder to identify as attributes and values (aerodynamic construction, curved hitting surface, etc.).

The illustrated classification process 102 treats the problem of extracting (identifying) desired information as a classification problem and, therefore, employs one or more classification algorithms (possibly in addition to other processing techniques) for this purpose. As known in the art, classification algorithms can be applied to documents in an attempt to classify individual words within a document into one of several predefined classes. In a presently preferred embodiment, these classes are defined as attribute, value or neither (in addition to a default class of unassigned). Words that, have been classified in this manner can be thought of as "labeled" data. It should be noted that labeled data may come in the form of individually labeled words or phrases that exist outside the confines of a document structures e.g., seed attributes and corresponding seed values, as described in the '215 application and\or the '244 application. In contrast, a document comprises unlabeled data if not all of its constituent words have previously been classified. As known in the art, classification algorithms may be characterized into three different categories: unsupervised, supervised an semi-supervised. Unsupervised classification algorithms do not require any labeled data as input in order to work, whereas supervised classification algorithms require labeled data in order to train the classifier. Semi-supervised classification algorithms can incorporate both labeled training data and unlabeled data. In a presently preferred embodiment described in greater detail below, a semi-supervised classification algorithm is employed.

Regardless of the particular classification algorithm employed, the classification process 102 provides the desired information 108 as output based in part upon the user input 106. In practice, the classification algorithm employed by the classification process 102 attempts to assign (in a probabilistic sense) a label (e.g., attribute or value) to all unlabeled data elements in the classifiable electronic data 104 provided to it. Generally, the user input 106 is in the form of one or more classification selections for data elements (e.g., words and/or phrases) selected to maximize the efficacy of the classification algorithm. For example, the classification process 102 may query a user (typically, a subject matter domain expert) regarding the classification of a previously unclassified or ambiguously classified data element. Based on the particular classification provided by the user, the classification algorithm can update the underlying model to further classify other data elements and/or to further refine the classification probabilities assigned to previously labeled data elements, as described in greater detail below.

Figure 2:
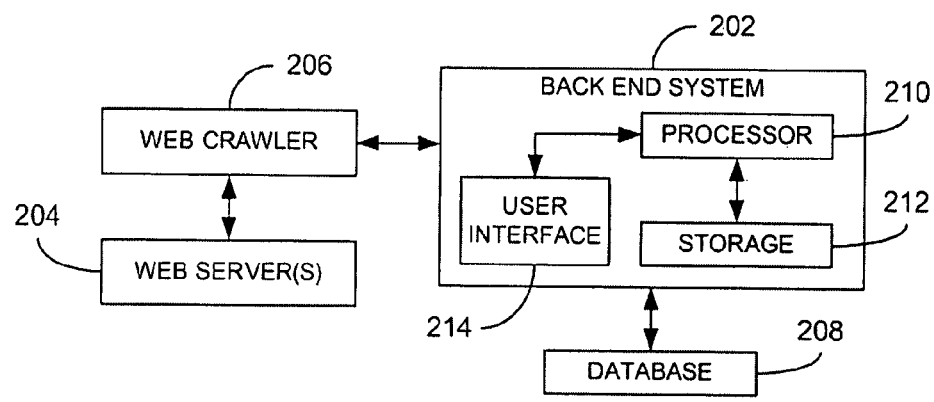
FIG. 2 is a block diagram illustrating a system in accordance with the instant disclosure.

Referring now to FIG. 2, a system that may be used to implement one or more of the various embodiments of the present invention is further illustrated. In particular, a back end system 202 is coupled to a database 208. As shown, the back end system 202 comprises at least one processor 210 (such as a microprocessor, microcontroller, digital signal processor, etc. or combinations thereof) coupled to a storage device 212 (such as random-access memory, read-only memory, optical and/or magnetic storage devices, etc.) having stored thereon executable instructions that may be executed by the at least one processor 210. Generally, the back end system 202 comprises one or more general purpose computers suitably programmed to perform the techniques described herein. As known by those having ordinary skill in the art, however, such processing devices may incorporate, or be replaced by, specialized processing circuits such as programmable logic arrays, application-specific integrated circuits, etc. as a matter of design choice. Additionally, the back end system 202 may comprise a display and other user input/output devices 214, as known in the art, that allow a user of the back end system 202 to interact with and otherwise control processing in accordance with the present invention. For example, the user input/output devices 214 may comprise touch screens, mouse and cursor combinations, keyboards, stylus, input screens, microphones speakers, etc. In particular, as described below, the user interface 214 is used to support active learning for the classification process implemented by the back end system 202.

In a presently preferred embodiment, the desired classifiable electronic data is available via a public communications network such as the World Wide Web. For example, in the case of natural language documents, such data may be found in the form of textual content in web pages. Such content typically resides on one or more web servers 204 coupled to the back end system 202 using conventional techniques. Web servers are well known to those having skill in the art. When gathering the documents, a so-called web crawler 206 (i.e., a computer-executed program that visits remote sites and automatically downloads their contents) may be used. The web crawler 206 is programmed to visit websites of relevant entities (e.g., retailers, manufacturers, etc.) and extract, by way of non-limiting example, names, Uniform Resource Locators, descriptions, prices and categories of all products available. Such a web crawler 206 is preferably implemented using computer-programming techniques and may be programmed to automatically extract information or, in a simpler implementation, manually configured to extract specific information. As the web crawler 206 collects suitable information (documents), the information is stored in the database 208, which may comprise a suitably configured server computer. Of course, sources of documents other than web sites, such as internal databases or other non-publicly accessible sources, may be equally employed, along with appropriate corresponding information extraction methods. Further, it, is, not a requirement of the present invention that classifiable electronic data be collected in this manner. For example, pre-compiled databases of such data may be equally employed.

Figure 3:
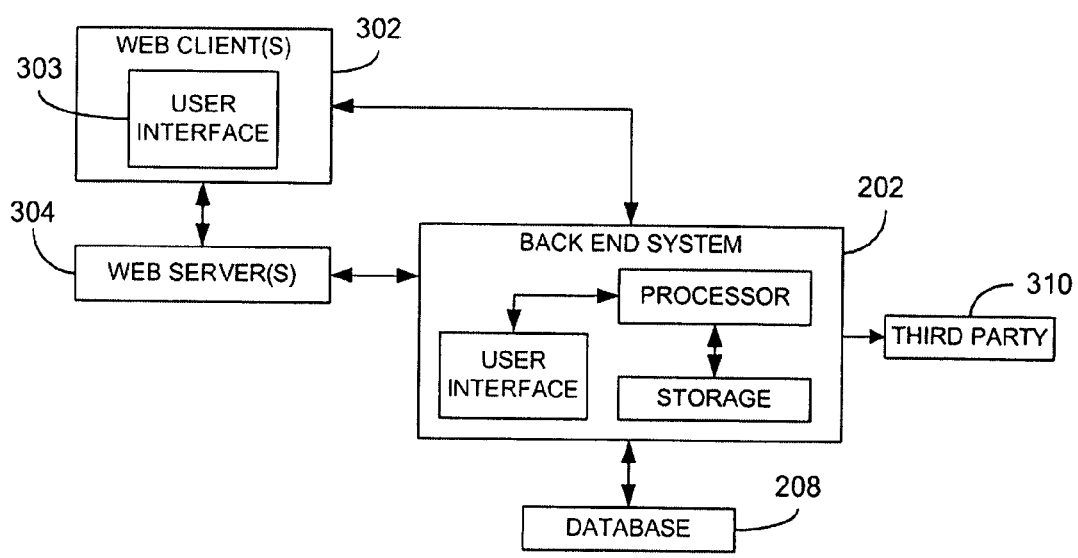
FIG. 3 is a block diagram illustrating an alternative system in accordance with the instant disclosure.

Referring now to FIG. 3, another system is shown in which the back end system 202 and database 208 are used to analyze classifiable electronic data. In particular, the back end system 202 is coupled, preferably via a public communications network such as the World Wide Web, to a web client 302 and/or one or more web servers 304. Once-again, web-clients are well known to those having ordinary skill in the art. In a currently preferred embodiment, the web client 302 comprises a user interface 303 (preferably implemented in the same or similar manner to the user interface 214 provided by the back end system 202) that allows a user to provide input to, in response to queries provided by, the classification process implemented by the back end system 202, and/or to receive information from the one or more web servers 304. Techniques for communicating between the back end system 202 and the one or more web clients 302 are well known to those of ordinary skill in the art. In a presently preferred embodiment, described in greater detail below with reference to FIG. 6, either or both of the user interfaces 214, 303 can be implemented in the form of a graphical user interface.

As in FIG. 2, the classifiable electronic data is preferably provided through web sites and web pages. In this case, the back end system 202 may directly access the relevant web sites to obtain the new data. As noted above, although web-based sources of data are presently preferred, the instant invention is not necessarily limited in this regard, and suitable data may come from virtually any source provided that the data may be reduced to a format whereby the back end system 202 is able to analyze it, e.g., manually entered into a computer, scanned and automatically recognized, etc.

Regardless of the source of the classifiable electronic data, the back end system 202 may perform the processing described herein to extract the desired information (e.g., attributes and values of products). The resulting extracted information 108 may then be stored in the database 208 as part of a larger knowledge base, or may be provided to the web client 302, the web server(s) 204, 304 or to a third party 310. For example, in the case of the use off extracted attribute-value pairs that are descriptive of products, an individual browsing a retailer's web site may wish to see how his or her selections are perceived in terms of the defined attributes. Conversely, a retailer implementing a web site on the web server(s) 304 may wish to understand how its product offerings are perceived. Further still, one retailer (e.g., a third party 310) may want to know the attributes of a competitor's product line.

As noted above, the techniques described herein may be beneficially applied to a variety of classification systems including, in particular, the attribute-value extraction system described in the '215 and '244 applications. In general, the attribute-value extraction system described in the '215 and '244 applications comprises four main sections:

1. Data Collection from an internal database containing product information/descriptions or from the web using web crawlers and wrappers.

2. Seed Generation, i.e., automatically creating seed attribute-value pairs for use by the classification algorithm(s).

3. Attribute-Value Extraction from unlabeled product descriptions. In a preferred embodiment, a semi-supervised algorithm (co-EM) with underlying Naive Bayes classifier is employed.

4. Attribute-Value Pair Relationship Determination, i.e., forming pairs from extracted attributes and values. The various techniques employed for this purpose include, but are not limited to, a dependency parser and/or co-location scores.

While the above-described extraction system works well, further benefit may be obtained through the use of active learning to allow users to further train the system. In particular, active, learning may be employed to further enhance operation of the classification section, as described below. As known in the art, classification techniques are effective tools for extracting information from text. However, as with most automated techniques, the output is not always correct, making an interactive phase where a user can give feedback an important part of the system. In general, active learning, in the classification algorithms, involves the following steps:

1. Pool Selection. This step deals with identifying which unlabeled examples are candidates for prompting for user feedback and made available to the active learner, i.e., the classification algorithm. Techniques for establishing the pool of candidates are well known in the art, such as having only unlabeled data elements or labeled data elements where the assigned probabilities are ambiguous, and the techniques described herein are not dependent upon the particular pool selection technique employed.

2. Sample Selection. This step focuses on the intelligent selection of the next example(s) to query the user about from the pool. Generally, this is done by estimating how much the model can learn from knowing the label of an unlabeled example, and various techniques for accomplishing this are well known in the art although, once again, the presently described techniques are not limited to any particular sample selection technique. For example, random sample selection or the so-called density or KL-divergence sample selection metrics may be equally employed.

3. Learning Algorithm. This step addresses how user feedback is incorporated into the model. Prior art techniques simply retrain the model with the training data including the newly labeled example(s), i.e., the user input, typically leading to long wait times between user input iterations.

Figure 4:
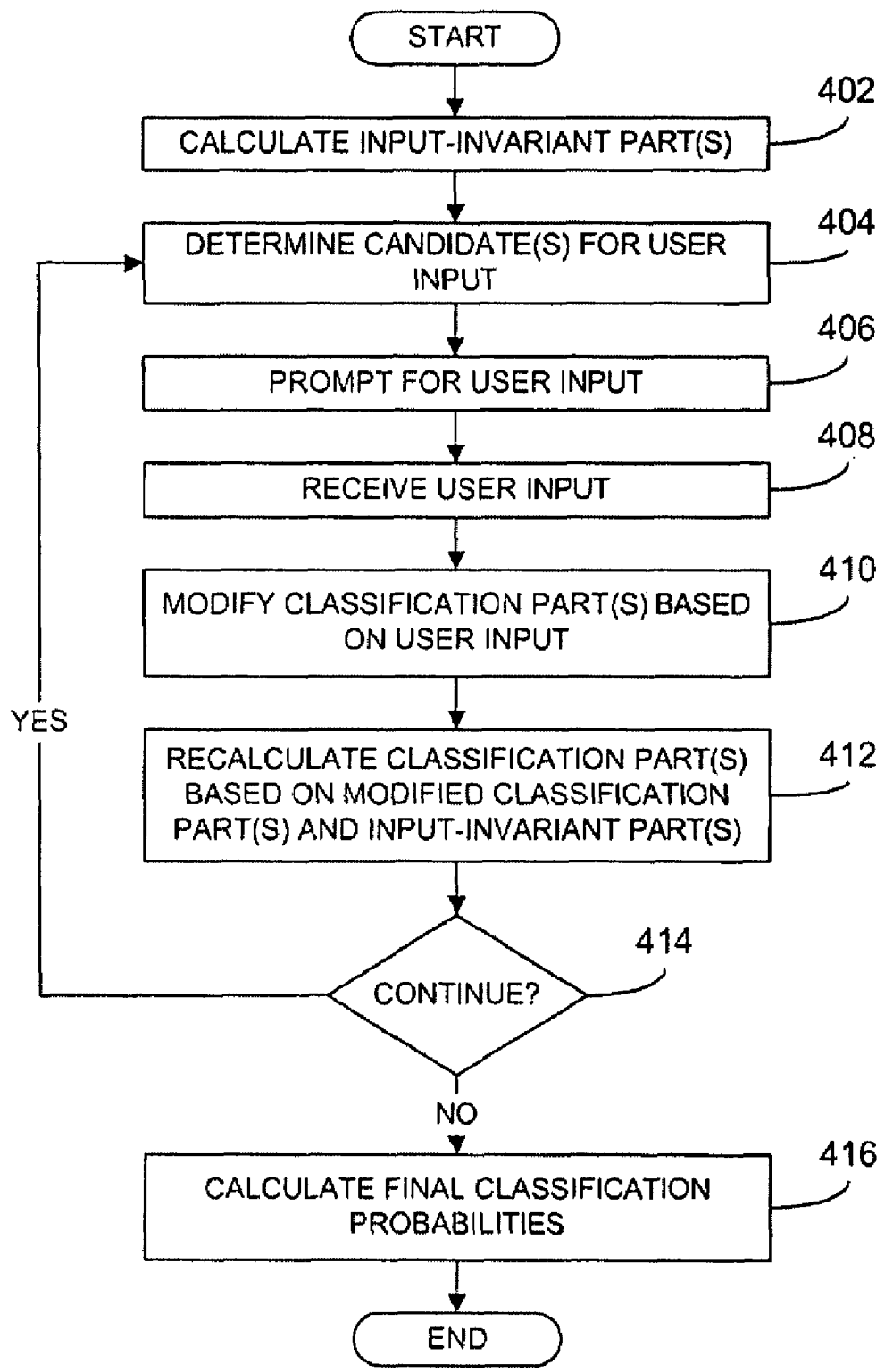
FIG. 4 is a block diagram of an implementation of an apparatus in accordance with the instant disclosure.
Figure 5:
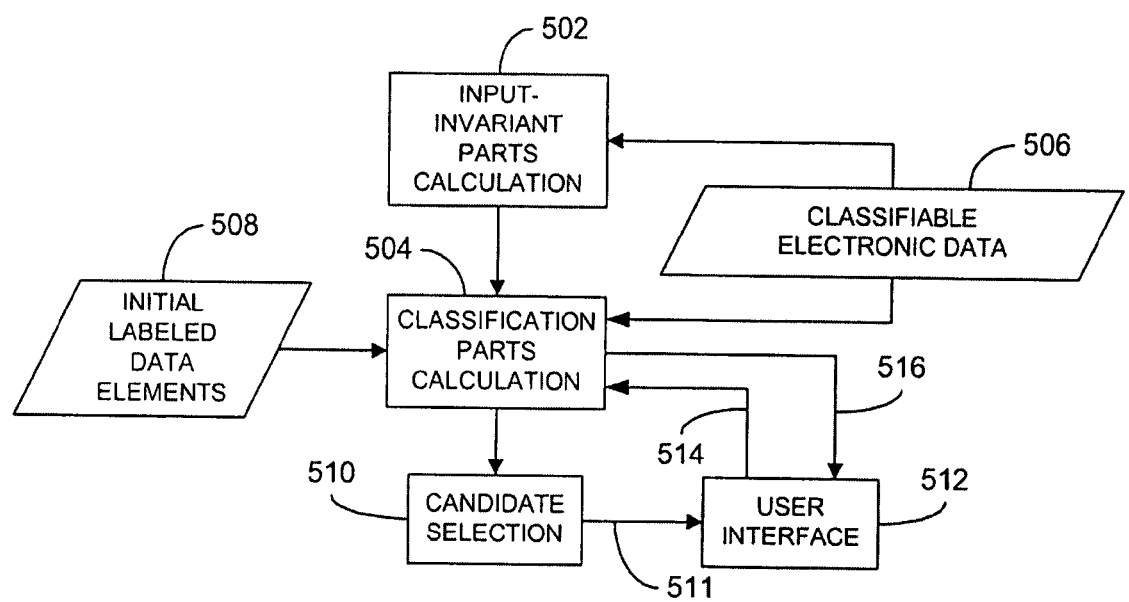
FIG. 5 is a flowchart illustrating processing in accordance with the instant disclosure.

Referring now to FIGS. 4 and 5, a technique for incorporating user feedback into a classification algorithm, and an apparatus for implementing such technique, are further described. In a presently preferred embodiment, the method and apparatus illustrated in FIGS. 4 and 5 are implemented using stored, executable instructions executed by one or more processing devices, as described above, based on known programming techniques. However, it is understood that other implementation techniques, such as programmable logic arrays, application specific integrated circuits, etc. may be equally employed, as known in the art, to implement some or all of the techniques described in FIGS. 4 and 5. Semi-supervised classification algorithms operate by combining relatively small amounts of labeled data with large amounts of easily-gathered unlabeled data. Generally, it is anticipated that the technique illustrated in FIGS. 4 and 5 may be beneficially applied to many types of semi-supervised classification algorithms. A presently preferred semi-supervised algorithm, as discussed in greater detail below, is the so-called co-EM algorithm described in Nigam, K., & Ghani, R. (2000). Analyzing the applicability and effectiveness of co-training. Proceedings of CIKM 2000, 9th ACM International Conference on Information and Knowledge Management (pp. 86-93). McLean, US: ACM Press, New York, US., the teachings of which are incorporated herein by this reference.

Referring now to FIG. 4, processing begins at block 402 where one or more input-invariant parts of a classification algorithm are calculated. In general, classification algorithms used herein are separable into one or more input-invariant parts and one or more classification parts that are readily combinable to quickly calculate the desired classification probabilities for a plurality of data elements (e.g., the words and phrases in a natural language document) in classifiable electronic data. The input-invariant part or parts of the classification algorithm capture the underlying and unchanging relationships between the plurality of data elements being operated upon by the classification algorithm. For example, the frequency with which certain data elements occur in proximity to other data elements is an unchanging characteristic of a given document. Still other invariant metrics may be employed, such as the frequency with which a word is used, its part of speech (and the parts of speech of the words in its context), the number of words in its context that are capitalized or acronyms, etc. The input-invariant parts of the classification algorithm capture these unchanging relationships in a manner that allows them to be readily incorporated into a probabilistic classification determination. On the other hand, the one or more classification parts embody the probabilistic labeling, of the data elements according to the various classifications available in the model. That is, the one or more classification parts encompass the classification probabilities of the data elements in a manner that is separate from the relationship-dependent information encompassed by the input-invariant part(s). Because the input-invariant parts of the classification algorithm are unchanging relative to the underlying document being analyzed, they can be pre-computed, i.e., prior to soliciting and obtaining user input or feedback, and subsequently relied upon.

One or more candidate data elements to be used in soliciting user input or feedback are determined at block 404. As noted above, this is preferably performed by first selecting a candidate pool and thereafter selecting specific examples to be used to solicit the user input. For example, in the case of attribute-value extraction, all words or phrases that remain un-labeled may be considered as the candidate pool, whereas a selection metric (such as the density or KL-divergence metrics) may be employed to select one or more specific words and/or phrases that would most beneficially impact the classification model. Once the one or more candidates data elements are determined, processing continues at block 406 where a user of the system is prompted for input or feedback, which user input is subsequently received at block 408. For example, using the user interfaces described, above, an input query may be presented to the user, which the user subsequently responds to using an appropriate user input device. In practice, the user will typically be a subject matter expert that is qualified to make classification determinations based on his/her particular domain-specific knowledge, although the techniques described herein are not limited by the qualifications of the user.

Continuing at block 410, one or more of the classification parts are modified based on the user input, and the resulting modified classification part(s) is subsequently used at block 412 to recalculate the classification parts based on the at least one input-invariant part and the modified classification part(s). By recalculating the one or more classification parts in this manner; the resulting classification probabilities (i.e., probabilities that a given data element is properly classified according to any of a number of different classifications) that incorporate the user's input may be quickly determined. That is, because the one or more input-invariant parts may be calculated prior to obtaining any user input, the operations necessary to determine the recalculated classification part(s) may be substantially reduced, thereby minimizing waiting time between user input iterations. A more detailed explanation of exemplary input-invariant and classification parts of a classification algorithm are described: in greater detail below.

After completion of an iteration of soliciting user input and incorporating the received user input into the recalculated classification part(s), processing continues at block 414 where it is determined whether to continue with another iteration of user input. In a presently preferred embodiment, this determination may be made based on the number of iterations already performed or on a convergence condition basis. In the former, a desired number of user feedback iterations is determined and processing will continue as described above until the desired number of iterations is reached (or until the user indicates that no further iterations are desired). In the latter, a convergence condition test is employed to determine whether any further improvement of the model has been made. For example, a suitable convergence condition might comprise determining, after incorporating an iteration of user input, whether any unlabeled data elements remain. Those of ordinary skill in the art will appreciate that other convergence conditions may be readily determined and equally employed. If another iteration is desired or required, processing continues at block 404 as described above. Otherwise, processing continues at block 416 where final classification probabilities for the data elements are determined based on the most-recently recalculated classification parts. For example, in a presently preferred embodiment described in greater detail below, classification probabilities from multiple classification parts and corresponding to individual data elements are averaged to arrive at the final classification probabilities for the individual data elements. Where multiple classification parts are employed, combination techniques other than simple averaging (e.g., weighted averages, etc.) may be used as a matter of design choice.

Referring now to FIG. 5, an apparatus suitable for implementing the technique described above relative to FIG. 4 is illustrated. In particular, an input-invariant parts calculation component 502 and a classification parts calculation component 504 are provided as shown. Both components 502, 504 receive classifiable electronic data 506. As described above, the input-invariant parts calculation component 502 calculates the input-invariant part(s) of the classification algorithm, whereas the classification parts calculation component 504 calculates (and re-calculates) the one or more classification parts based oiel various inputs. That is, during an initialization phase, the classification parts calculation component 504 determines the classification parts (i.e., the classification of at least some of the data elements found in the classifiable electronic data 506) based on initial labeled data elements

508, sometimes referred to as "seeds". Thereafter, the input-invariant parts are combined with the classification parts to determine the recalculated classification parts. Further still, using the candidate selection component 510, which selects various candidate data elements as described above, one or more candidate data elements, 511 may be determined after each recalculation of the classification parts and provided to a user interface 512. The subsequently received user input 514 may then be incorporated into the classification parts that are subsequently recalculated. Likewise, the classification probabilities 516 can be provided to the user interface 512 for review by the user.

A specific implementation of the above-described techniques is now described with reference to a particular semi-supervised classification algorithm, i.e., the co-EM algorithm using an underlying Naïve Bayes classifier. Co-EM is a multiview, semi-supervised learning algorithm that combines features from both co-training and Expectation-Maximization (EM) and is therefore iterative, like EM, but uses the feature split present in the data, like co-training. In a presently preferred embodiment, the multiple views employed comprise each given data element to be classified and the context in which it occurs. To express each data element in two views, each word is expressed in view1 by the stemmed word itself, plus the part of speech as assigned by the well-known Brill tagger. In a presently preferred embodiment, the view2 for this data element is a context of window size 8, i.e. up to 4 words (plus parts of speech) before and up to 4 words (plus parts of speech) after the word or phrase in view1. Of course, other window sizes may be employed as a matter of design choice. By default, all words are processed into view1 as single words. Phrases that are recognized through correlation scores (e.g., Yule's Q, $\chi^2$, or pointwise mutual information), are treated as an entity and thus as a single view1 data item. Initially, co-EM uses the initial labeled data elements 508 to label all occurrences of the training examples in view1. These labels are then used to probabilistically label all view2 elements, using an underlying classification algorithm, as well as the co-occurrence counts between each view1 and view2 data element. As noted above, the underlying classifier may comprise a Naïve Bayes classifier, although other classifiers may be equally employed. In a similar fashion, the view2 elements are then used to re-label the view1 elements. This process labeling one view based on the other, and vice versa, is repeated for a number of iterations or until convergence.

In order to formulate co-EM into input-invariant and classification parts, as described above, a simpler variant is employed to maximize case of computations: co-EM with relative frequencies as the underlying classifier. Suppose we want to determine a distribution over all possible labels for each training or data element, both in view1 and view2. Suppose further that, in an attribute-value extraction problem, there are four possible labels, i.e., unassigned, attribute, value, neither (with all items defaulting to unassigned at the beginning). The classification probabilities for these labels may be denoted as p(1|<view1, view2>), p(2|<view1, view2>), p(3|<view1, view2>), p4(1|<view1, view2>), respectively. Although this exemplary embodiment uses attributes and values as the desired classification, it is understood that virtually any desired classification schema may be used. Recall that the final goal of the algorithm is to assign these probabilities to each data element. In each iteration, however, view1 and view2 are labeled separately a follows.

Initially, all view1 items and view2 items default to unassigned. Using the initial labeled data, all labeled view1 items are reassigned to their respective class (attribute or value). This serves as the initial labeling of all view1 data items.

The next step is to re-label all view2 data items using the view1 labels. The label distribution of a view2 element $v2_{i2}$, $1 \leq i2 \leq n2$, where n2 is the number of distinct v2 elements, is obtained from the view1 elements $v1_{i1}$, $1 \leq i1 \leq n1$, where n1 is the number of distinct v1 elements it aligns with, weighted by the number of times the v1 and v2 elements align. Denote $cooc(v1_{i1}, v2_{i2})$ as the number of times $v1_{i1}$ and $v2_{i2}$ align (co-occur in the sense that $v1_{i1}$ is found within the window defining $v2_{i2}$) with each other. Then, the conditional probability for the first classification given a view2 data element may be expressed as:

$$p(1 | v2_{i2}) = \frac{\sum_{i1=1}^{n1} cooc(v2_{i2}, v1_{i1}) * p(1 | v1_{i1})}{\sum_{i1=1}^{n1} cooc(v2_{i2}, v1_{i1})} \quad (1)$$

Similarly, conditional probabilities for $p(2|v1_{i2})$, $p(3|v1_{i2})$, and $p(4|v1_{i2})$ may also be expressed.

Re-estimation of all view1 elements follows in the reverse way. However, for those $v1_{i1}$ that are found in the initial labeled data elements, there is no re-estimation and for $1 \leq j \leq 4$:

$$p(j|v1_{i1}) = \text{initial\_labeling} \quad (2)$$

The re-estimation steps are repeated until convergence or for a set number of iterations. The final probabilities for a data element in its context is finally assigned as follows for $1 \leq j \leq 4$:

$$p(j | \langle v1_{i1}, v2_{i2} \rangle) = \frac{p(j | v1_{i1}) + p(j | v2_{i2})}{2} \quad (3)$$

Based on this formulation of the co-EM algorithm, it becomes possible to separate the classification algorithm into the above-described input-invariant and classification parts. Particularly, this results from the first insight that the re-estimation can essentially be viewed as a matrix multiplication:

Let $A_1$ be the classification probability matrix of view1 (i.e., the classification part corresponding to view1) that, is obtained by the initial labeling of all view1 elements using the initial labeled data elements. In this example, $A_1$ is of size $n_1 \times 4$. Denote each view1 data element as $v1_i$, $1 \leq i \leq n1$, where n1 is the number of view1 data elements. Denote the classes $c_j$, $1 \leq j \leq 4$, where the classes are as described above. This matrix will have the following form:

$$A_1 = \begin{bmatrix} p(c_1 | v1_1) & p(c_2 | v1_1) & p(c_3 | v1_1) & p(c_4 | v1_1) \\ p(c_1 | v1_2) & p(c_2 | v1_2) & p(c_3 | v1_2) & p(c_4 | v1_2) \\ \ldots & \ldots & \ldots & \ldots \\ p(c_1 | v1_{n1}) & p(c_2 | v1_{n1}) & p(c_3 | v1_{n1}) & p(c_4 | v1_{n1}) \end{bmatrix} \quad (4)$$

Let $A_2$ be the $n_2 \times 4$ classification probability matrix of view2 (i.e., the classification part corresponding to view2), defined in the same ways as $A_1$. Further, let $B_{1,2}$ be the $n_1 \times n_2$ transition matrix from view1 to view2. This transition matrix is a sparse matrix that stores, for every view1 entry, all the view2 data elements that it co-occurs with, along with the count of how often the view1 and view2 co-occur. The transition matrices are normalized by the total number of co-occurrences for each data element. $B_{1,2}$ thus takes the following form:

$$B_{1,2} = \begin{bmatrix} p(v2_1|v1_1) & p(v2_2|v1_1) & \cdots & p(v2_{n2}|v1_1) \\ p(v2_1|v1_2) & p(v2_2|v1_2) & \cdots & p(v2_{n2}|v1_2) \\ \cdots & \cdots & \cdots & \cdots \\ p(v2_1|v1_{n1}) & p(v2_2|v1_{n1}) & \cdots & p(v2_{n2}|v1_{n1}) \end{bmatrix} \quad (5)$$

Where:

$$p(v2_{i2}|v1_{i1}) = \frac{cooc(v2_{i2}, v1_{i1})}{\sum_{i2=1}^{n2} cooc(v2_{i2}, v1_{i1})} \quad (6)$$

$B_{2,1}$, the $n_2 \times n_1$ transition matrix from view2 to view1, is defined in an analogous way. Note that neither $B_{1,2}$ or $B_{2,1}$ is dependent upon the classification probabilities of a given data element across the various classes, but are instead dependent upon relationships of the various data elements (as expressed by the chosen views) to each other.

Each iteration of the modified co-EM algorithm can then be formalized as a matrix multiplication:

$$A'_2 = B_{2,1} * A_1 \quad (7)$$

Where $A'_2$ is the recalculated classification part corresponding to view2. Similarly:

$$A'_1 = B_{1,2} * A'_2 \quad (8)$$

Where $A'_1$ is the recalculated classification part corresponding to view1. Note that this multiplication is equivalent to the above iterative algorithm for those items that are not in the initial training data, i.e., each cell (i, j) in the resulting matrix will be the result of the sum of all the probabilities for column j (the class label) for all the data items in the other view with which i has a non-zero transition probability, weighted by this transition probability.

Note also that the multiplications of Equations (7) and (8) are the first iteration of the modified co-EM algorithm. Further iterations proceed by the same principle, e.g., $$A''_2 = B_{2,1} * A'_1 \quad (9)$$

This computation exhibits a recursive property:

$$A''_2 = B_{2,1} * A'_1 \quad (10)$$
$$= B_{2,1} * (B_{1,2} * A'_2)$$
$$= B_{2,1} * (B_{1,2} * (B_{2,1} * A_1))$$

As matrix multiplication is associative, the following holds:

$$A''_2 = B_{2,1} * (B_{1,2} * (B_{2,1} * A_1)) \quad (11)$$
$$= (B_{2,1} * B_{1,2} * B_{2,1}) * A_1$$

Further iterations may be similarly calculated. The recalculated classification part for each view is computed by multiplying the original classification part of the other view by a product of transition matrices, where the number of factors is a function of the number of desired co-EM iterations. In other words, the co-EM algorithm can either be run iteratively as first described above, or by multiplying the original $A_1$ by the transition matrices.

Note that when re-calculating $A_2$, we will have a product of transition matrices that is different from the one used for recomputing $A_1$. More specifically, a similar derivation to the above holds, with the exception that $A_1$ will be re-calculated as follows:

$$A''_1 = (B_{1,2} * \ldots * B_{1,2} * B_{2,1}) * A_1 \quad (12)$$
$$= T_{1,1} * A_1$$

whereas $A_2$ will be re-calculated with:

$$A''_2 = (B_{2,1} * \ldots * B_{1,2} * B_{2,1}) * A_1 \quad (13)$$
$$= T_{2,1} * A_1$$

$T_{1,1}$ and $T_{2,1}$ are then simply the products of transition probabilities. In effect, each cell (i, j) in the transition matrix $T_{1,1}$ represents, the influence view1 data element j has on view1 data element i after n iterations. Similarly, each cell (i, j) in the transition matrix $T_{2,1}$ represents the influence view1 data element j has on view2 data element i after n iterations.

As laid out in the iterative algorithm, re-calculation of classification probabilities as described here only applies to the cases where a data element is not already known from the original labeled data. For known examples, the iterative algorithm will proceed by simply not re-labeling view1 elements in any of the iterations. The computation of $T_{1,1}$ and $T_{2,1}$ as described above did not take this into account. Rather, in such cases, the transition matrix should reflect that the label for a view1 element is known.

To this end, note again that the transition matrices capture how much impact one data element has on another. In the case of the initial labeled data elements, they receive the same probability distribution in each iteration, i.e., they should be "updated" only from themselves and not from other data items. This can be accomplished by setting all transition probabilities in $T_{1,1}$ into the data item to 0 except the transition from itself, i.e., the row for data item $v1_{i1}$ is all 0s except for the cell $T_{1,1}(i_1, i_1)$.

With the co-EM algorithm formulated in this manner, it remains to incorporate user input into the calculation of the various classification parts. To this end, note once again that the data element classification probabilities do not modify the transition matrices. For this reason, the transition matrices respectively constitute the input-invariant parts of the modified co-EM classification algorithm. Stated another way, a user interaction will not have any impact on the transition matrix products $T_{1,1}$ and $T_{2,1}$, which products can therefore be pre-computed, i.e., prior to or while awaiting user input. In this manner, processing may proceed as follows: prior to soliciting user input, or while awaiting such input, the input-invariant parts $T_{1,1}$, and $T_{2,1}$, are pre-computed. As a result, the user is not forced to wait for these computations since they are not dependent on the user's input. When the user does provide feedback, the necessary classification part (in this example, $A_1$) is modified accordingly. For example, and with reference to Equation (4) above, if the user input indicates that data element $v1_k$ in view1 should be assigned to the classification $c_j$, $1 \leq j \leq 4$, then the Seth row in $A_1$ should be modified such that:

$$p(c_i | v1_k) = 0, \quad i \neq j \qquad (14)$$
$$= 1, \quad i = j$$

That is, the probabilities of all classifications other than the classification specified by the user's input should be set to 0. In an alternative embodiment, rather than setting the probability for the selected classification to 1 (i.e., indicating, essentially, that the user is absolutely certain of his/her classification choice), another value (less than 1 but greater than 0) could be used to reflect the particular level of certainty assigned by the user to his/her classification selection. In this same vein, the classification probabilities of the non-chosen classifications, rather than being set to 0, could be set to one or more non-zero values that are still less: than the chosen classification probability.

Thereafter, the classification parts $A_1$ and $A_2$ are re-calculated according to Equations (12) and (13), i.e., based upon the modified classification part, $A_1$, and the input-invariant parts. When all iterations have been completed, or upon satisfaction of a convergence condition, final probabilities are then assigned as in the iterative algorithm above, i.e., by averaging the view1 and view2 probabilities for each data item found in the classification parts.

Figure 6:
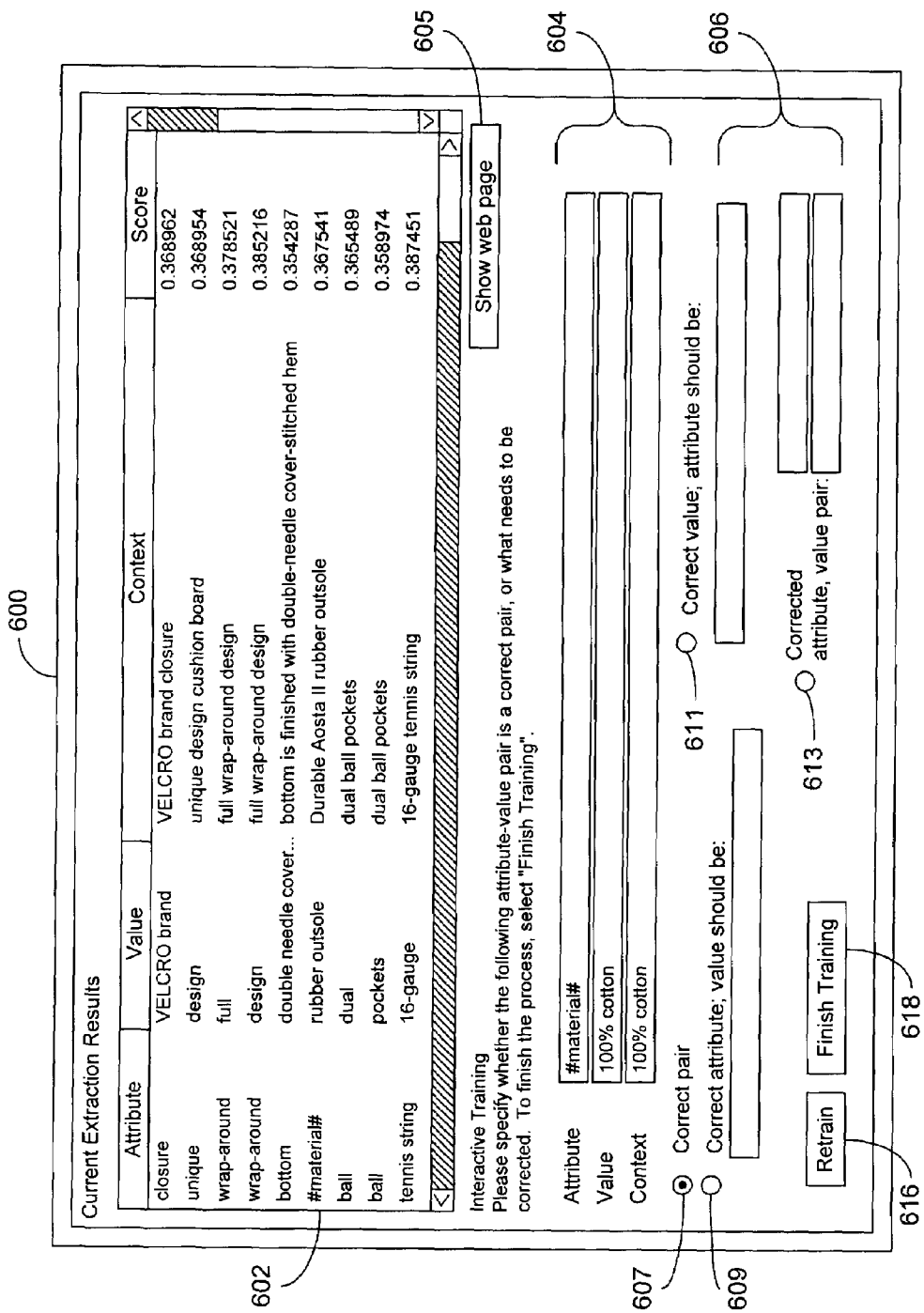
FIG. 6 is an exemplary user interface that may be beneficially employed in conjunction with the various embodiments described herein.

Referring now to FIG. 6, an exemplary user interface is illustrated. In particular, the user interface comprises a graphical user interface 600 such as may be presented to a user via a suitable display device. For example, the graphical user interface 600 may be formed as a web page that is downloaded to a web client, as described above. Techniques for implementing such web pages are well known to those of ordinary skill in the art. In the exemplary embodiment, a classification results window 602 is provided. As shown, the results window 602 sets forth the various attributes and values previously identified, the context in which they occur, as well as their respective scores, i.e., probabilities of the assigned classification. Additionally, one or more display mechanisms (in this case, text boxes) are used to set forth an input query 604 concerning a selected candidate data element, as described above. In the example shown, the query 604 asks the user to determine whether "100% cotton" constitutes a value when used in the identical context. Note that, in the exemplary interface, the input query 604 is presented according to the classification algorithm's current understanding as to the appropriate classification. Further note that a button 605 is provided that allows the user to request the actual web page in which the selected candidate data element (i.e., the current document being analyzed) is found. In this manner, the user can gain additional insight as to how the subject data element is being used and therefore form a more accurate response.

A variety of user input response options 606 are illustrated in FIG. 6. In the illustrated example, various radio buttons are provided whereby the user may select one of a plurality of possible responses. For example, a first radio button 607 allows the user to simply agree with the classification presented in the query 604. Using a second radio button 609, the user can indicate that the presented attribute is correct, but that the value should be something else that the user subsequently supplies in the provided text box. Conversely, a third radio button 611 may be used if the presented value is correct, but another attribute should be; used, again as entered by the user in the text box. Further still, a fourth radio button 613 may be used if neither the presented attribute or value is correct, with the user entering corrected attributes and values in the provided text boxes. Note that, in those situations where the user specifically designates a corrected attribute or value (i.e., when using any of the second through fourth radio buttons 609-613), the corrected attribute or value should be found in the context of the presented example, thereby assuring that the existing classification probabilities will be modified in the one or more classification parts, as described above.

If the user wishes to continue with further iterations, a retrain input button 616 may be selected. In this case, the classification parts are updated as described above, and another input query 604 is subsequently provided. Conversely, if the user wishes to terminate the training session, a finish training input button 618 may be selected. In this case, no further input, query 604 is provided and the results window 602 is updated to reflect the final classification probabilities determined by the classification algorithm.

As described above, the instant disclosure describes techniques for incorporating active learning into classification systems without the substantial delays typically encountered in prior art approaches. This is achieved through the formulation of the classification algorithm into one or more input-invariant parts and one or more input-dependent classification parts which may be combined to provide the desired classification probabilities. User input, preferably obtained by a suitable graphical user interface or the like, is used to modify one or more of the classification parts, thereby avoiding re-calculation of the input-invariant part(s). As a result, the benefit of active learning is attained without incurring the time delays of prior art solution. For at, least these reasons, the above-described techniques represent an advancement over prior art teachings.

While particular preferred embodiments have been shown and described, it will be obvious to those skilled in the art that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. In a system, implemented by at least one processing device, based on a classification algorithm operating upon classifiable electronic data, a method for incorporating user input concerning classification of a plurality of data elements in the classifiable electronic data, the method comprising:
    calculating a first input-invariant part, independent of classification probabilities for the plurality of data elements, of the classification algorithm;
    receiving user input concerning classification of at least one data element of the plurality of data elements;
    modifying a first classification part of the classification algorithm based on the user input to provide a modified first classification part; and
    calculating a recalculated first classification part based on the modified first classification part and the first input-invariant part,
    wherein the recalculated first classification part comprises first classification probabilities for at least a portion of the plurality of data elements.

2. The method of claim 1, further comprising:
    calculating a second input-invariant part of the classification algorithm; and calculating a recalculated second classification part of the classification algorithm based on the modified first classification part and the second input-invariant part, wherein the recalculated second classification part at least indicates second classification probabilities for the portion of the plurality of data elements.

3. The method of claim 2, further comprising:

calculating final classification probabilities for the portion of the plurality of data elements based on the first classification probabilities and the second classification probabilities.

4. The method of claim 1, wherein the classification algorithm comprises a modified co-EM algorithm.

5. The method of claim 1, further comprising receiving the user input via a user interface.

6. The method of claim 5, further comprising:

determining at least one candidate data element of the plurality of data elements for prompting the user input; and presenting an input query concerning the at least candidate data element via the user interface, wherein the user input is received in response to the input query.

7. An apparatus, implemented by at least one processing device, for performing classification based on a classification algorithm operating upon classifiable electronic data, and incorporating user input concerning classification of a plurality of data elements in the classifiable electronic data, the apparatus comprising:

an input-invariant calculation component operative to calculate a first input-invariant part, independent of classification probabilities for the plurality of data elements, of the classification algorithm;

a user input component operative to receive user input concerning classification of at least one data element of the plurality of data elements; and a classification calculation component, in communication with the input-invariant calculation component and the user input component, operative to modify a first classification part of the classification algorithm based on the user input to provide a modified first classification part, and to calculate a recalculated first classification part based on the modified first classification part and the first input-invariant part, wherein the first classification part comprises first classification probabilities for at least a portion of the plurality of data elements.

8. The apparatus of claim 7, the input-invariant calculation component being further operative to calculate a second input-invariant part of the classification algorithm, and the classification calculation component being further operative to calculate a recalculated second classification part of the classification algorithm based on the modified first classification part and the second input-invariant part, wherein the recalculated second classification part at least indicates second classification probabilities of the portion of the plurality of data elements.

9. The apparatus of claim 8, the classification calculation component being further operative to calculate final classification probabilities for the portion of the plurality of data elements based on the first classification probabilities and the second classification probabilities.

10. The apparatus of claim 7, further comprising:

a user interface in communication with the classification calculation component and operative to receive the user input.

11. The apparatus of claim 10, further comprising:

a candidate selection component, in communication with the classification calculation component and the user interface, operative to determine at least one candidate data element of the plurality of data elements for prompting the user input, and to provide an input query concerning the at least one candidate data element to the user interface for presentation to a user of the apparatus.

12. The apparatus of claim 11, wherein the user interface comprises a graphical user interface.

13. An apparatus for performing classification based on a classification algorithm operating upon classifiable electronic data, and incorporating user input concerning classification of a plurality of data elements in the classifiable electronic data, the apparatus comprising:

at least one processor; and at least one storage device, coupled to the at least one processor, comprising processor-executable instructions that, when executed by the at least one processor, cause the at least one processor to:

calculate a first input-invariant part, independent of classification probabilities for the plurality of data elements, of the classification algorithm;

receive user input concerning classification of at least one data element of the plurality of data elements;

modify a first classification part of the classification algorithm based on the user input to provide a modified first classification part; and calculate a recalculated first classification part based on the modified first classification part and the first input-invariant part, wherein the recalculated first classification part comprises first classification probabilities for at least a portion of the plurality of data elements.

14. The apparatus of claim 13, the at least one storage device further comprising processor-executable instructions that, when executed by the at least one processor, cause the at least one processor to:

calculate a second input-invariant part of the classification algorithm; and calculate a recalculated second classification part of the classification algorithm based on the modified first classification part and the second input-invariant part, wherein the recalculated second classification part at least indicates second classification probabilities for the portion of the plurality of data elements.

15. The apparatus of claim 14, the at least one storage device further comprising processor-executable instructions that, when executed by the at least one processor, cause the at least one processor to:

calculate final classification probabilities for the portion of the plurality of data elements based on the first classification probabilities and the second classification probabilities.

16. The apparatus of claim 13 further comprising a display and at least one user input device in communication with the at least one processor, the at least one storage device further comprising processor-executable instructions that, when executed by the at least one processor, cause the at least one processor to:

determine at least one candidate data element of the plurality of data elements for prompting the user input;

present an input query concerning the at least candidate data element via the display; and receiving the user input in response to the input query via the at least one user input device.

* * * * *